United States Patent [19]
Thiel et al.

[11] 3,826,175
[45] July 30, 1974

[54] BRAKE BOOSTER

[75] Inventors: Rudolf Thiel; Armin Lauterwasser, both of Frankfurt am/Main, Germany

[73] Assignee: ITT Industries, Inc., New York, N.Y.

[22] Filed: Nov. 3, 1972

[21] Appl. No.: 303,465

[30] Foreign Application Priority Data
Nov. 5, 1971  Germany............................ 2155169

[52] U.S. Cl. ................................. 91/369 B, 91/376
[51] Int. Cl............................................. F15b 9/10
[58] Field of Search ........... 91/369 B, 369 R, 369 A

[56] References Cited
UNITED STATES PATENTS
| | | | |
|---|---|---|---|
| 3,009,445 | 11/1961 | Wuellner.......................... | 91/369 B |
| 3,009,449 | 11/1961 | Rike.................................. | 91/369 B |
| 3,033,173 | 5/1962 | Bauman ........................... | 91/369 B |
| 3,209,658 | 10/1965 | Randol............................. | 91/369 B |

*Primary Examiner*—Paul E. Maslousky
*Attorney, Agent, or Firm*—John T. O'Halloran; Minotti J. Lombardi, Jr.; Alfred C. Hill

[57] ABSTRACT

This relates to a pneumatic brake booster and more particularly to the reaction mechanism which controls the application of the mechanical force (brake pedal force) and pneumatic servo-force to the output push rod which in turn operates on the brake pressure medium. The reaction mechanism includes specially designed reaction segments, a reaction ring and a supporting disc all of which are supported in such a way on an end of the control piston adjacent the output push rod that assembly is easy and force ratios can be easily changed.

19 Claims, 10 Drawing Figures

PATENTED JUL 30 1974          3,826,175

BRAKE BOOSTER

BACKGROUND OF THE INVENTION

The invention relates to a brake booster with a control piston mechanically actuable by an axial force, a control housing arranged around said control piston, a pneumatic cup-shaped cylinder provided with a pneumatic piston connected with the control housing, a valve arranged between the control piston and the control housing, said valve actuation of the control piston connecting the pressure chamber of the pneumatic cup-shaped cylinder to a pressure source and closing it again due to a reaction mechanism as soon as the pressure in the pressure chamber reaches a value corresponding to the mechanical force, said mechanical force and the pneumatic servo-force acting on the output push rod via the reaction mechanism.

Known brake boosters of this kind include a reaction element, such as levers of different embodiments, a diaphragm or a rubber disc. However, these reaction elements have the disadvantage that in the long run wear cannot be prevented.

SUMMARY OF THE INVENTION

In contrast to this an object of the present invention is to provide a brake booster of the kind mentioned at the beginning having a reaction mechanism which is manufacturable as simply and as cheaply as possible, while having a great safety as regards operation and, above all, a long working life. Furthermore the brake booster of the present invention is designed such that the ratio between pedal force and pneumatic servo-force can be changed in a relatively simple manner.

A feature of the present invention is the provision of a brake booster comprising: a control piston mechanically actuable by an axial force; a control housing disposed concentrically of the control piston; a pneumatic cup-shaped cylinder connected to the control housing; a pneumatic piston disposed in the pneumatic cylinder; a pressure source; a valve disposed between the control piston and the control housing in communication with the pneumatic cylinder, the valve upon actuation of the control piston connecting a pressure chamber of the pneumatic cylinder to the pressure source; an output push rod; and a reaction mechanism connected to the output push rod and between the control piston and the control housing to combine the axial force and a pneumatic servo-force in the pneumatic cylinder for acting on the output push rod, the reaction mechanism disconnecting the pressure chamber from the pressure source as soon as the pressure in the pressure chamber achieves a value equal to the axial force; the reaction mechanism including a plurality of reaction segments disposed circumferentially about and parallel to an end of the control housing and the control piston adjacent the output push rod and extending radially between the control piston and the control housing, each of the reaction segments having a force combining point intermediate the ends thereof acting on the output push rod, the ratio of the distance between the inner end of each of the reaction segments and the force combining point to the distance between the outer end of each of the reaction segments and the force combining point determining the ratio of the pneumatic servo-force to the axial force.

For the solution of this task the invention provides that reaction segments are circumferentially distributed about and between the control piston and the control housing, said reaction segments having one end abut the control piston and the other end abut the control housing, said reaction segments acting on the output push rod by means of a force combining point lying in between said one end and said other end thereby forming an inner lever arm and an outer lever arm, and the ratio of the inner lever arm to the outer lever arm determines the ratio of the servo-force with respect to the mechanical force applied.

A preferred embodiment is arranged such that the control housing has the same number of guides projecting from its front surface to receive the reaction mechanism as there are reaction segments, said reaction segments being arranged radially displaceable between said guides, but being retained in the circumferential direction.

The guides preferably have two flat mainly radially extending sides in order to guide adjacent reaction segments, and two flat sides in the form of the circumference of the reaction ring in order to guide the reaction ring moving within said guide.

The arrangement of several reaction segments about the circumference of the control housing results in a sufficient distribution of the braking forces. The reaction segments are arranged at equal angular distances from each other.

With regard to the manufacture it is especially favorable if each reaction segment has a simple flat form and especially if it is punched out of steel sheet material.

At the outside the reaction segments are preferably rounded off to conform to the shape of the housing. According to another embodiment the reaction segments are also rounded off on the inside to conform to the diameter of the control piston and are arranged in a groove of the control piston.

A further preferred feature of the invention consists in the arrangement of a supporting disc between the control housing and the reaction segments, said supporting disc having a central aperture for the passage of the control piston and as many arms extending outwardly between the guides as there are reaction segments, the end of each arm forming a tangential edge on which the outwardly extending reaction segments come to rest, said edge representing the outside abutment point or fulcrum of the thusly formed levers.

A further embodiment provides that the tangential edges forming the abutment point consist of the same material as the housing, for instance, of plastic, and are wodked at will into said housing.

A further embodiment provides that a reaction ring is inserted between the reaction elements and the output push rod or a pressure plate fixed to said push rod, the inner rim or edge of said reaction ring being a polygon with as many sides as there are reaction segments, the polygonal sides determining the intermediate abutment or force combining point of the levers. Preferably the ring is round at the outside.

According to another embodiment the groove in the control piston is only that much longer than the thickness of the reaction segments so that the play necessary for the control action is safeguarded and that there is an optimal function curve. In their rest position the reacting segments are separated from their inner abutment or fulcrum point.

Furthermore it is provided that the supporting disc as well as the reaction ring are preferably punched out of steel sheet material, the sharp edges arising from the punching operation facing the reaction segments. Thus, a determined point of attack is provided for the forces transmitted by the levers formed by the reaction segments.

In a further embodiment tabs projecting from the sides of the supporting disc and the reaction ring opposite from the sharp edges are provided, said tabs engaging corresponding apertures in the control housing and the pressure plate, respectively.

The same safety with regards to assembly is achieved if the inner shape or the outer shape, respectively, of the supporting disc or the reaction ring is provided with such a configuration that the parts cannot be assembled in a reversed manner.

The inventive reaction segments are particularly suitable for the supply from a magazine upon manufacture. This is due to their flat form provided with parallel sides.

A sheet metal cylinder connected with the control housing is preferably arranged on the outside around the arrangement of reaction segments, said sheet metal cylinder holding the reaction segments at the bottom of the groove. Preferably the reaction ring is held concentrically together with the other elements by the guide, while the supporting disc is centered by the inner aperture of the control piston or control housing, respectively. All parts of the arrangement are arranged concentrically to each other.

According to a further embodiment a pressure spring is arranged between the control piston and the control housing, said pressure spring always trying to move the control piston with relation to the control housing into a position in which the valve shuts off the pressure chamber from the pressure source, and the inner abutment or fulcrum point separates from the control piston. The dimensions are preferably such that in rest position the reaction segments abut the end of the groove opposite the actuating edge.

Preferably the reaction rings and supporting discs are provided with the same outside or inside diameter, respectively, but with different radial positions of the tangential edges. Hereby nothing changes for the assembly dimensions of these parts, while the abutment points of the reaction segments at the edges can be changed in radial direction. By a simple exchange of the reaction rings or the supporting discs the ratios of the mechanically applied pedal force and the pneumatic servo-force can be changed. The same brake booster type can thus be easily adapted to the most varied cases of application.

According to another embodiment the distance between the control piston and the pressure plate is rated such that upon full control the front side of the control piston directly abuts the pressure plate. Hereby, upon full control the mechanical force is transmitted directly onto the pressure plate so that the reaction segments are not additionally loaded by bending and, thus, have very small dimensions.

By the direct transmission of the mechanical force an optimal safety is guaranteed.

BRIEF DESCRIPTION OF THE DRAWING

Above-mentioned and other features and objects of this invention will become more apparent by reference to the following description taken in conjunction with the accompanying drawing, in which:

FIG. 1a shows an enlarged cross-sectional view of the reaction mechanism and its associated corporating elements of FIG. 1 in a non-operative condition;

FIG. 1b shows an enlarged cross-sectional view of a portion of FIG. 1a with the reaction mechanism in an operative condition;

DESCRIPTION OF THE PREFERRED EMBODIMENT

Figure 1:
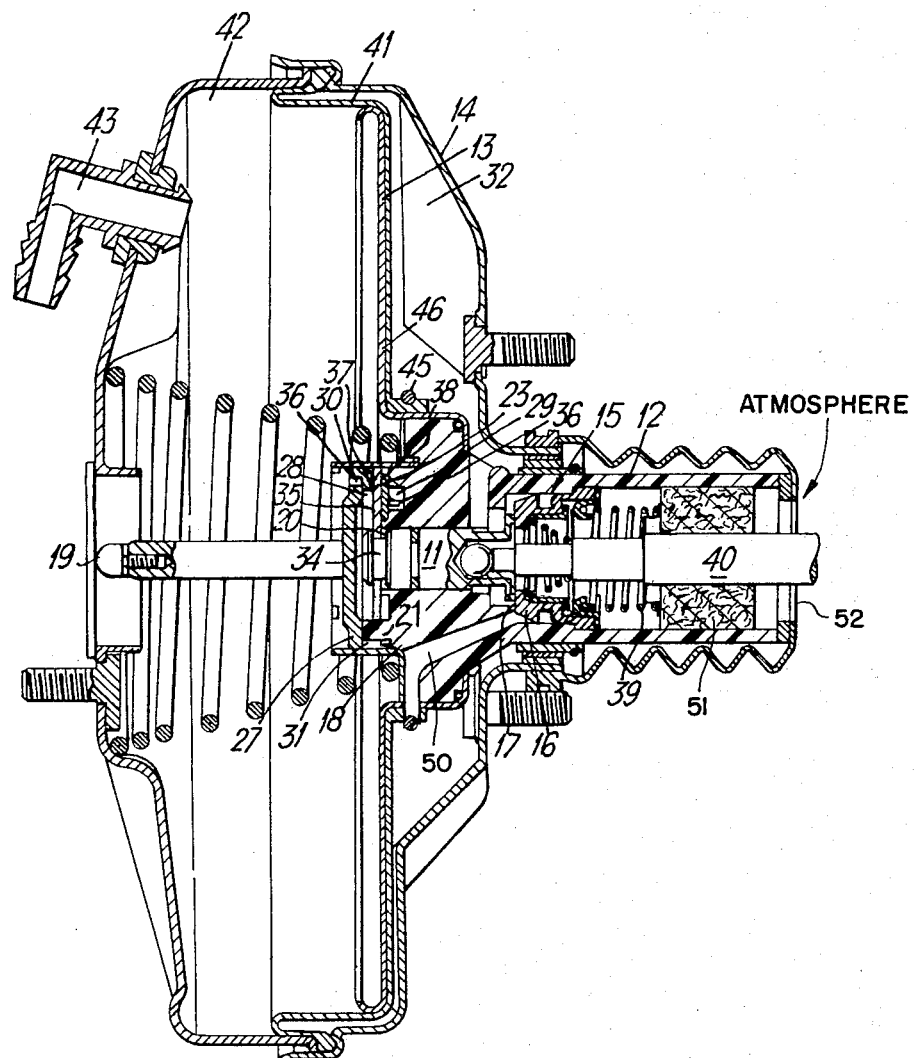
FIG. 1 shows a cross-section of a brake booster in accordance with the principles of the present invention.

Referring to FIGS. 1, 1a and 1b a control piston 11 is arranged concentrically and displaceably in a control housing 12. Control piston 11 is actuated mechanically by the brake pedal of the vehicle via a push rod 40.

The pneumatic piston 13 of a cup-shaped cylinder 14 is connected with control housing 12, the relative displaceability of pneumatic piston 13 is cup-shaped cylinder 14 being safeguarded by a diaphragm 41. The left chamber 42 of cup-shaped cylinder 14 is connected to a vacuum source (not shown) via a socket 43.

A valve 15 is arranged concentrically with respect to control housing 12 and push rod 40, said valve 15 comprising an elastic seal ring 16 and two edges or sealing lips 17 and 18, respectively. The pressure chamber 32 of cup-shaped cylinder 14 is connected in the position shown in FIG. 1 in a manner known per se to the same low-pressure source as is chamber 42 so that no force acts on pneumatic piston 13.

If push rod 40 in FIG. 1 is now moved to the left, elastic seal ring 16 puts itself first on the sealing lip 17 and thus closes off chamber 32 from the vacuum source. In the further course of the movement sealing lip 18 lifts off elastic seal ring 16 due to piston 11 moving to the left and, thus, pressure chamber 32 is connected to the atmosphere through bore 50, seal ring 16 after lip 18 has been lifted off, filter 51 and aperature 52. There is now a pressure difference between chambers 32 and 42 which generates the pneumatic servo-force.

Figure 3:
FIG. 3 shows a plan view and a lateral view of a reaction segment of FIG. 1 in accordance with the principles of the present invention.

The reaction mechanism designed according to the present invention mainly comprises the reaction segments 35, the supporting disc 23, and the reaction ring 28. This reaction mechanism is essential for the functioning of the brake booster and especially to provide a booster force proportional to the mechanical actuating force. According to FIG. 3 reaction segments 35 are flat-shaped steel elements which according to FIG. 1 rest with their inner part converging to a wedge on the bottom of a groove 34 on the front end of control piston 11 and extends radially outward to a sheet metal cylinder 31 connected with control housing 12, said sheet metal cylinder 31 retaining the steel reaction segments 35 in their radial position.

Figure 2:
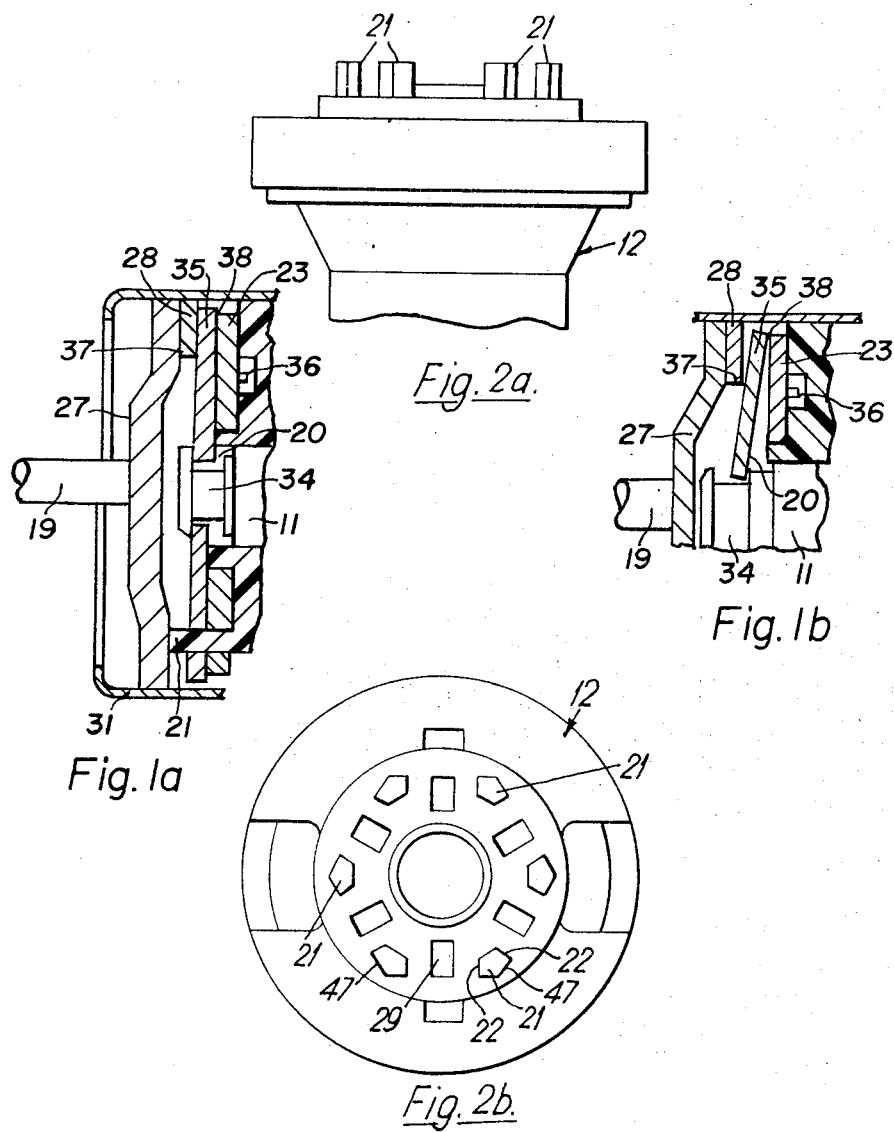
FIG. 2a and 2b show a front and a lateral view of the inventive control housing with a flange for the pneumatic piston arranged at said housing.

The circumferential position of reaction segments 35, according to FIGS. 2a and 2b, are retained by guides 21 projecting from control housing 12, said guides 21 preferably consisting of a plastic material as does the whole control housing.

In the illustrated embodiment six guides 21 and six reaction segments 35 are provided, distributed over the circumference at the same angular distances from each other.

Guides 21 have mainly radially extending lateral sides 22 by which the straight lateral edges of reaction segments 35 are guided, and tangential lateral edges 47 by which the reaction ring 28 is guided.

According to the invention the reaction segments are inserted loosely between the guides 21, a special fixing is not necessary and an automatic assembly is possible.

Figure 4:
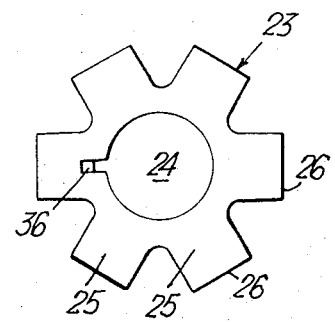
FIG. 4 shows a plan view of the supporting disc of FIG. 1 in accordance with the principles of the present invention.

According to the invention supporting disc 23, illustrated separately in FIG. 4, is arranged between the front side of control housing 12 and reaction segments 35, said supporting disc having in its center an aperture 24 for the passage of control piston 11 and for the centering of said supporting disc and radially outwardly extending arms 25 the number and angular distances of which are equal to those of reaction segments 35.

Arms 25 are provided at the outside with tangentially extended edges 26 and in their radial dimension are rated such that reaction segments 35 project by a small extent beyond arms 25.

Figure 5:
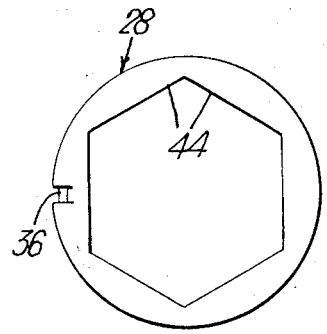
FIG. 5 shows a plan view of the reaction ring of FIG. 1 in accordance with the principles of the present invention.

Reaction ring 28 illustrated in detail in FIG. 5 has an internal edge of polygonal form so that edges 44 are generated for the support of reaction segments 35.

The output push rod 19 acting on a hydraulic cylinder is in operative connection with reaction ring 28 via a pressure plate 27.

According to the invention supporting disc 23 and reaction ring 28 are preferably punched out of steel sheet material. In order to have the clearly defined sharp edges generated by the punching always face reaction segments 35 apertures 30 and 29 are provided, e.g., in pressure plate 27 and in control housing 12, respectively, said apertures engaging tabs 36 formed in supporting disc 23 or reaction ring 28. Therefore, without special attention of the attendant the right position of these parts with respect to reaction segments 35 is safeguarded. The same effect is achieved by the embodiment of supporting disc 23' of FIG. 6 and reaction ring 28' of FIG. 7 a false insertion being automatically excluded by the unsymmetrical central apertures 48 and 44', respectively, and correspondingly formed counterparts of control housing 12.

A pressure spring 39 is provided between control housing 12 and control piston 11, said pressure spring 39 prestressing the two parts against each other such that in rest position the left edging of groove 34 abuts reaction segments 35. In other words, upon actuation control piston 11 first moves freely to the left before applying force to reaction segments 35 with the right edging of groove 34.

Due to the inventive arrangement reaction segments 35 practically form a two-armed lever which has an inner abutment or fulcrum point 20, an intermediate abutment or force combining point 37 at reaction ring 28, and an outer abutment or fulcrum point 38 at supporting disc 23. The ratio of the lever arms from point 20 to point 37 and from point 37 to point 38 determines the ratio of mechanical and pneumatic force which as a whole represent the brake force effective at push rod 19.

This ratio can be changed to a considerable extent without the necessity of changing anything in the total concept of the inventive brake booster. If the dimensions of aperture 24 of supporting disc 23 and the external dimensions of reacting ring 28 according to FIG. 5 remain the same, these elements fit into the arrangement without any difficulty. By changing the radial length of arms 25 or the radial dimension of ring 28 the ratio of mechanical brake force and pneumatic servoforce can be adjusted in the most simple manner. Preferably only the arrangement of edge 44 is changed.

The inventive arrangement operates as follows:

If according to FIG. 1 brake piston 11 moves to the left, it finally carries along to the left reaction segments 35 after having transgressed the play of groove 34. In doing this, a counterforce is transmitted onto control housing 12 due to the effect of the lever formed by segment 35, said counterforce keeping the balance of the servo-force by means of the pressure in pressure chamber 32. According to the invention the total force effective at push rod 19 is in proportion with the pedal force. Reaction segments 35 have the same dimension for all transmission ratios concerned.

Thus, special characteristics, fixing noses, centering cages, plastic foils etc. can be dispensed with and an automatic assembly is made possible. Also mistakes with respect to the assembly are eliminated.

In order to change the transmission ratio only the supporting disc is changed or only the reaction ring is changed.

Furthermore, the inventive brake booster has a bigger operating extent by the improvement of the efficiency.

A further substantial inventive feature consists in that in cross-section guides 21 are roof-shaped at their outside edge such that reaction ring 28 can be slipped over the whole arrangement of guides 21. Guides 21 hold the supporting disc, the reaction segments and the reaction ring.

Preferably supporting disc 23 as well as reaction segments 35 cannot be changed, while only edge 44 of reaction ring 28 is changed in its position in order to achieve differing transmission ratios.

According to a further embodiment arms 25 of supporting disc 23 can be changed accordingly in order to achieve differing transmission ratios. The parts 35 and 28 remain unchanged.

For the rest, the working of the brake booster corresponds to that of known types.

The assembly of the inventive device can be carried out in a very simple and economic manner. First, the control housing and the reaction mechanism are assembled. Then the sheet metal cylinder 31 is shifted onto the whole arrangement, and the whole arrangement is fixed by pressing in a corrugation 45 into the diaphragm plate 46 which was put on before.

Figure 6:
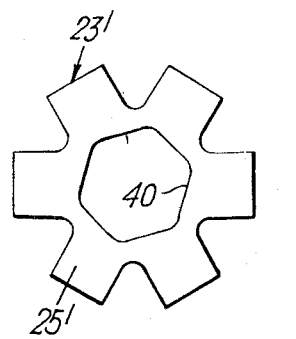
FIG. 6 shows a plan view of another embodiment of the supporting disc of FIG. 1.

In the particularly preferred embodiment of supporting disc 23' illustrated in FIG. 6 inner recess 48 has a hexagonal shape which is displaced as regards the angle with respect to the symmetrical axes. The inner section of the control housing is provided correspondingly with a shape corresponding to the hexagonal shape in order to center the supporting disc 23', said shape being arranged such that it is displaced on the control housing at the same angular degree with respect to the normal axes. This design of the supporting disc and the control housing has the effect that supporting disc 23' can be arranged in six different positions on the control housing, but it is always the same front surface which faces the control housing. The front surface disposed away from the control housing together with the lateral edges forms the sharp edge for the support of reaction segments 35.

Figure 7:
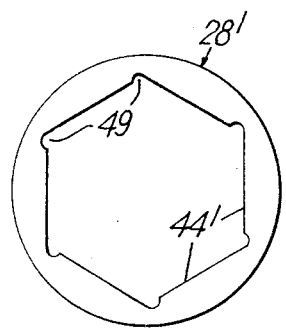
FIG. 7 shows a plan view of another embodiment of reaction ring of FIG. 1.

In an analogous manner the preferred reaction ring 28' illustrated in FIG. 7 can have unsymmetrical recesses 49 at the end of the inner edges 44', said recess 49 cooperating with one or more of guides 21.

According to the invention the sharp edges of the supporting discs and the reaction rings resulting from the punching are preferably subject to further processing. This is preferably effected by deburring such that the radius of curvature of the edges obtained by the further processing of the sharp edges is preferably 0.1 through 0.3 mm (millimeter).

While we have described above the principles of our invention in connection with specific apparatus it is to be clearly understood that this description is made only by way of example and not as a limitation to the scope of our invention as set forth in the objects thereof and in the accompanying claims.

We claim:

1. A brake booster comprising:
a control piston mechanically actuable by an axial force;
a control housing disposed concentrically of said control piston;
a pneumatic cup-shaped cylinder connected to said control housing;
a pneumatic piston disposed in said pneumatic cylinder;
a pressure source;
a valve disposed within said control housing in communication with said pneumatic cylinder, said valve upon actuation of said control piston connecting a pressure chamber of said pneumatic cylinder to said pressure source;
an output push rod; and
a reaction mechanism connected to said output push rod, said control piston and said pneumatic piston to combine said axial force and a pneumatic servo-force in said pneumatic cylinder for acting on said output push rod, said reaction mechanism disconnecting said pressure chamber from said pressure source as soon as the pressure in said pressure chamber achieves a value equal to said axial force;

said reaction mechanism including
a plurality of reaction segments disposed circumferentially about and parallel to an end of said control housing and said control piston adjacent said output push rod and extending radially between said control piston and said control housing, each of said reaction segments having a force combining point intermediate the ends thereof acting on said output push rod, the ratio of the distance between the inner end of each of said reaction segments and said force combining point to the distance between the outer end of each of said reaction segments and said force combining point determining the ratio of said pneumatic servo-force to said axial force;
said end of said control housing including
a plurality of guides projecting therefrom equal in number to said plurality of reaction segments to enable said reaction segments to be freely displaceable radially but retained in position in circumferential direction;
said reaction mechanism further including
a supporting disc disposed between said end of said control housing and said reaction segments, and
a reaction ring disposed between said reaction segments and a pressure plate secured to an adjacent end of said output push rod; and
said guides including
two flat sides extending substantially radially for guiding adjacent ones of said reaction segments and for fixing said supporting disc in a circumferential direction, and
two additional sides for guiding said reaction ring.

2. A booster according to claim 1, wherein
said reaction segments number at least six and are spaced equally from each other circumferentially about said control housing.

3. A booster according to claim 1, wherein
each of said reaction segments are flat.

4. A booster according to claim 1, wherein
each of said reaction segments is steel sheet material.

5. A booster according to claim 4, further including
a sheet metal cylinder connected to said control housing surrounding said reaction segments, said supporting disc, said retaining ring and said pressure plate, and
wherein
the outer end of each of said reaction segments is rounded to conform to the configuration of the inner surface of said sheet metal cylinder.

6. A booster according to claim 5, wherein
said control piston includes
a plurality of longitudinal convex grooves equal in number to said reaction segments, and
the inner end of said reaction segments is retained in the associated one of said grooves and rounded to conform to the convex configuration of said associated one of said grooves.

7. A booster according to claim 6, wherein
said supporting disc includes
a central aperture through which said control piston extends, and
a plurality of radially extending arms equal in number to said reaction segments, each of said arms coinciding with an associated one of said reaction segment but shorter than said reaction segments, the end of each of said arms forming a tangential edge which forms the outer fulcrum point for said associated one of said reaction segments.

8. A booster according to claim 7, wherein
said reaction ring includes
an inner edge having a polygon shape with the number of sides thereof equal to the number of said reaction segments and providing said force combining point for an associated one of said reaction segments.

9. A booster according to claim 8, wherein said reaction ring has a circular outer edge.

10. A booster according to claim 9, wherein said control piston provides an inner fulcrum point for each of said reaction segments, and
said grooves have a length from said end of said control piston to an actuating step of said control piston greater than the thickness of said reaction segments with said reaction segments in rest position being spaced from said inner fulcrum point.

11. A booster according to claim 10, wherein said supporting disc and said reaction ring are steel sheet material having sharp edges extending substantially perpendicular to one surface of said supporting disc and said reaction ring, said sharp edges of said supporting disc and said sharp edges of said reaction ring facing said reaction segments.

12. A booster according to claim 11, wherein said supporting disc includes
  a first tab extending from the surface of said supporting disc opposite said one surface of said supporting disc,
said reaction ring includes
  a second tab extending from the surface of said reaction ring opposite said one surface of said reaction ring,
said one end of said control housing including
  a first aperture to receive said first tab, and
said pressure plate including
  a second aperture to receive said second tab.

13. A booster according to claim 12, wherein each of said supporting disc and said reaction ring have an inner surface of predetermined configuration so that said supporting disc and said reaction ring can only be assembled such that said one surface of said supporting disc and said one surface of said reaction ring force said reaction segments.

14. A booster according to claim 13, wherein said central aperture of said supporting disc is polygonal in shape having the same number of sides as the number of said reaction segments, and the sides of said central apertures are displaced unsymmetrically with respect to the angle of said arms.

15. A booster according to claim 14, wherein said inner edge of said reaction ring includes
  unsymmetrical recesses with respect to the radii leading to said outer edge of said reaction ring to engage corresponding projections carried by said projecting pivots.

16. A booster according to claim 15, wherein said pneumatic piston is disposed outside said sheet metal cylinder, and
said sheet metal cylinder retains said reaction segments at the bottom of said grooves.

17. A booster according to claim 16, further including
  a pressure spring disposed between said control housing and said control piston, said pressure spring always trying to move said control piston in relation to said control housing to actuate said valve to disconnect said pressure chamber from said pressure source and which in rest position separates said inner fulcrum point from said reaction segments.

18. A booster according to claim 17, wherein either of said supporting disc and said reaction ring may be changed to provide different radial positions for one of said outer fulcrum points and said force combining points.

19. A booster according to claim 18, wherein the distance between said end of said control piston and said pressure plate is selected such that said end of said control piston physically engages said pressure plate to provide a safety feature for said booster should said booster receive excessive control or said servo-force of said booster breakdown.

* * * * *